United States Patent [19]

Kanematsu et al.

[11] Patent Number: 5,372,051
[45] Date of Patent: Dec. 13, 1994

[54] SHIFT LEVER ASSEMBLY FOR POWER TRANSMISSION OF AUTOMOTIVE VEHICLE

[75] Inventors: Hideki Kanematsu; Masaichi Suzuki, both of Kariya, Japan

[73] Assignee: Tsuda Kogyo Kabushiki Kaisha, Aichi, Japan

[21] Appl. No.: 73,517

[22] Filed: Jun. 9, 1993

[30] Foreign Application Priority Data

Dec. 14, 1992 [JP] Japan ................... 4-332925
Dec. 14, 1992 [JP] Japan ................... 4-332926

[51] Int. Cl.⁵ .................. B60K 20/00; G05G 5/06
[52] U.S. Cl. ...................... 74/473 R; 74/523; 74/538
[58] Field of Search .............. 74/473 R, 475, 501.6, 74/523, 538

[56] References Cited

U.S. PATENT DOCUMENTS

| | | | |
|---|---|---|---|
| 3,561,281 | 2/1971 | Wilfert | 74/473 R |
| 4,324,149 | 4/1982 | Johansson et al. | 74/473 R |
| 5,179,870 | 1/1993 | Behrens et al. | 74/475 |

FOREIGN PATENT DOCUMENTS 63-49764 4/1987 Japan .
62-162719 10/1987 Japan .

*Primary Examiner*—David W. Laub
*Attorney, Agent, or Firm*—Fisher & Associates

[57] ABSTRACT

A shift lever assembly adapted for use in a power transmission of an automotive vehicle, composed of a shift lever having a tubular body portion formed therein with an axial bore and provided at its lower end with a support portion to be mounted on a vehicle body structure and arranged perpendicularly to the tubular body portion and a connecting arm extending forwardly from the lower end of the tubular body portion, an operation rod slidably disposed within the axial bore of the tubular body portion and provided at its lower end with a detent mechanism for retaining the shift lever in a shifted position, and an operation knob having a grip portion connected to the upper end of the tubular body portion and an operation button assembled within the grip portion and maintained in engagement with the upper end of the operation rod. The tubular body portion, support portion and connecting arm of the shift lever are integrally made of synthetic resin, and the tubular body portion of the shift lever is enlarged in width at its lower end portion.

6 Claims, 10 Drawing Sheets

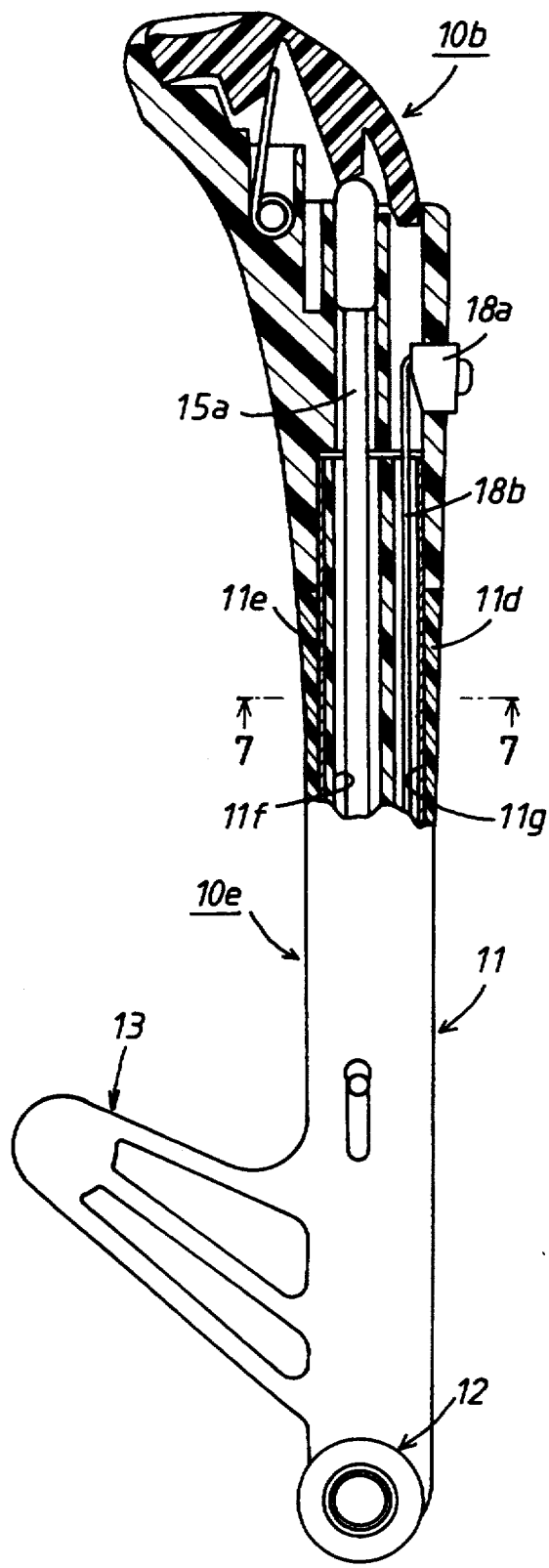
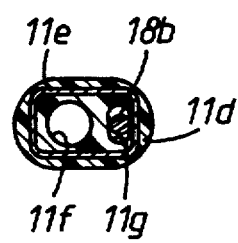
Fig. 7(a)
Fig. 7(b)

SHIFT LEVER ASSEMBLY FOR POWER TRANSMISSION OF AUTOMOTIVE VEHICLE

BACKGROUND OF THE INVENTION

1. Field of the Invention

The present invention relates to a shift lever assembly adapted for use in a power transmission of an automotive vehicle.

2. Description of the Prior Art

As disclosed in Japanese Utility Model Publications Nos. 62-162719 and 63-49764, a conventional shift lever assembly is composed of a tubular body member provided at its lower end with a support portion to be rotatably mounted on a vehicle body structure and arranged perpendicularly to the tubular body member, a connecting arm extending forwardly from the lower end of the tubular body member and connected to a shift arm of an automatic transmission by means of a connecting linkage, an operation rod slidably disposed within the tubular body member, and an operation knob connected to the upper end of the tubular body member. In operation, the shift lever assembly is moved by the operator forwardly or backwardly to shift the change-speed gearing of the automatic transmission.

In the conventional shift lever assembly, the tubular body member, the connecting arm and its connecting members are respectively made of metal and assembled with each other by welding, caulking and the like. This results in an increase of the component parts of the shift lever assembly and also results in an increase of the manufacturing cost of the shift lever assembly. Moreover, it is difficult to eliminate an error in assembly process of the component parts.

SUMMARY OF THE INVENTION

It is, therefore, a primary object of the present invention to provide a shift lever assembly the component parts of which are made of synthetic resin as much as possible to avoid the problems discussed above.

A secondary object of the present invention is to provide a shift lever assembly which includes a joint means capable of connecting an operation knob to the upper end of a shift lever without causing any defect in the appearance of the shift lever assembly.

According to the present invention there is provided a shift lever assembly adapted for use in a power transmission of an automotive vehicle, which comprises a shift lever having a tubular body portion formed therein with an axial bore and provided at its lower end with a support portion to be mounted on a vehicle body structure and arranged perpendicularly to the tubular body portion and a connecting arm extending forwardly from the lower end of the tubular body portion, an operation rod slidably disposed within the axial bore of the tubular body portion and provided at its lower end with a detent mechanism for retaining the shift lever in a shifted position, and an operation knob having a grip portion connected to the upper end of the tubular body portion and an operation button assembled with the grip portion and maintained in engagement with the upper end of said operation rod, wherein the tubular body portion, support portion and connecting arm of the shift lever are integrally made of synthetic resin, and wherein the tubular body portion of the shift lever is enlarged in width at its lower end portion.

In a practical embodiment of the present invention, it is preferable that the connecting arm of the shift lever is enlarged in width toward the lower end portion of the tubular body portion and reinforced by a plurality of ribs formed thereon. It is also preferable that the tubular body portion of the shift lever is composed of an outer tubular rod made of synthetic resin and a metallic inner pipe united with said tubular rod inserted therein and that the connecting arm of the tubular body portion has a connecting arm portion made of synthetic resin and a metallic connecting pin embedded in a distal end of the connecting arm portion for operative connection to the power transmission.

According to an aspect of the present invention, a joint means for connecting the grip portion of the operation knob to the upper end of the tubular body portion of the shift lever comprises a pair of diametrically opposed lugs integrally formed on the upper end of the tubular body portion, a pair of diametrically opposed lugs integrally formed on the lower end of the grip portion to be engaged with the lugs of the tubular body portion for restricting relative rotation of the tubular body portion and the grip portion, and a cylindrical holder rotatably coupled over the lugs of the tubular body portion and the grip portion engaged to each other, the holder having vertically spaced lugs formed therein to retain the engaged lugs of the tubular body portion and the grip portion by engagement therewith when the holder is rotated in a circumferential direction and retained in position.

According to another aspect of the present invention, the joint means for connecting the grip portion of the operation knob to the upper end of the tubular body portion of the shift lever may be composed of a pair of diametrically opposed lugs integrally formed with the upper end portion of the tubular body portion of the shift lever to be engaged with a pair of diametrically opposed semi-circular grooves formed within the lower end portion of the grip portion and retained by engagement with each stepped portion of the semi-circular grooves.

BRIEF DESCRIPTION OF THE DRAWINGS

Additional objects, features and advantages of the present invention will be more readily appreciated from the following detailed description of a preferred embodiment thereof when taken together with the accompanying drawings, in which:

FIG. 7(a) is a partly broken side view of a modification of the shift lever assembly;

FIG. 7(b) is a cross-sectional view taken along line 7(b)—7(b) in FIG. 7(a);

DESCRIPTION OF THE PREFERRED EMBODIMENT

Figure 1:
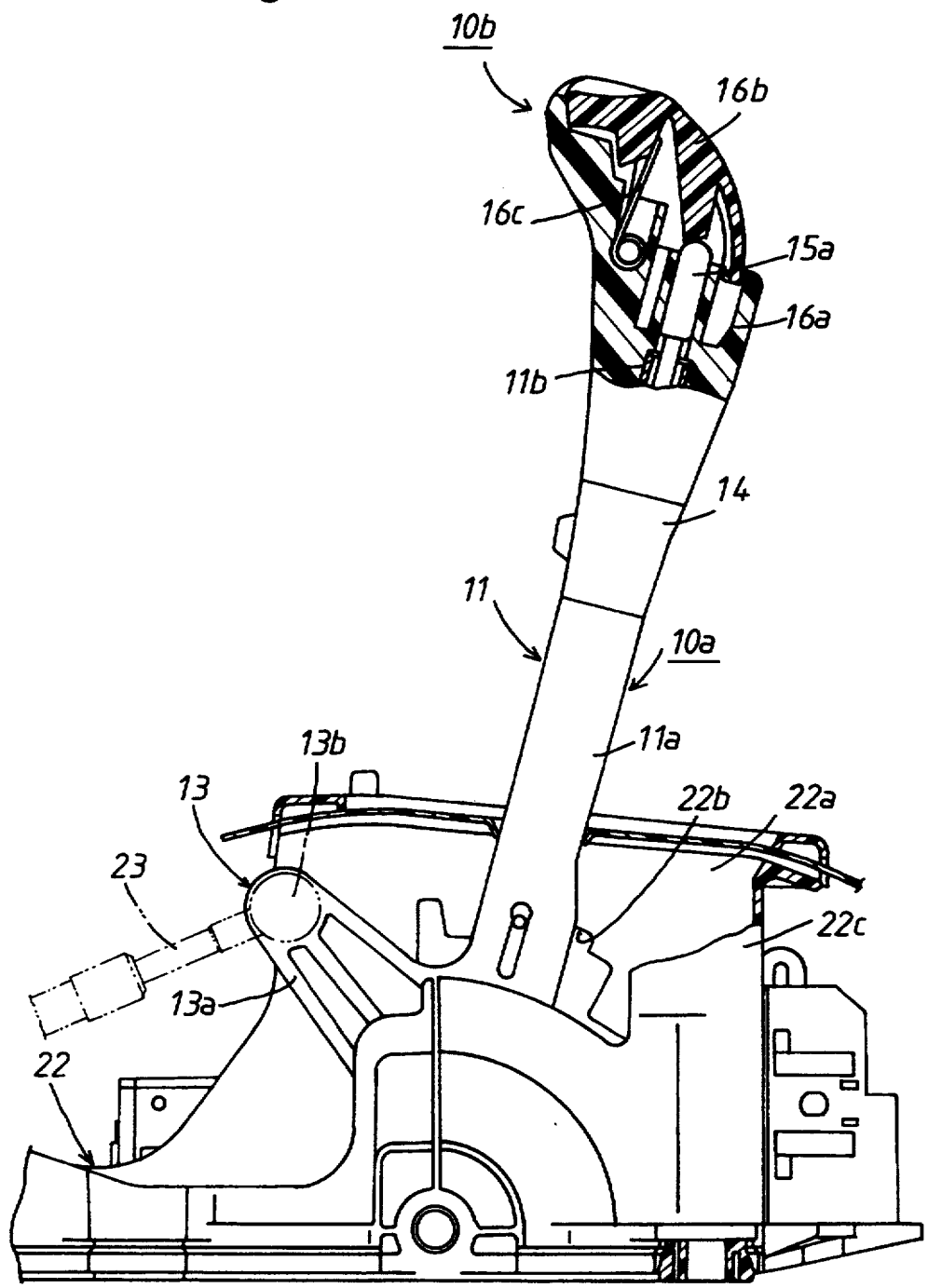
FIG. 1 is a partly broken side view of a change-speed operation mechanism equipped with a shift lever assembly according the present invention.
Figure 2:
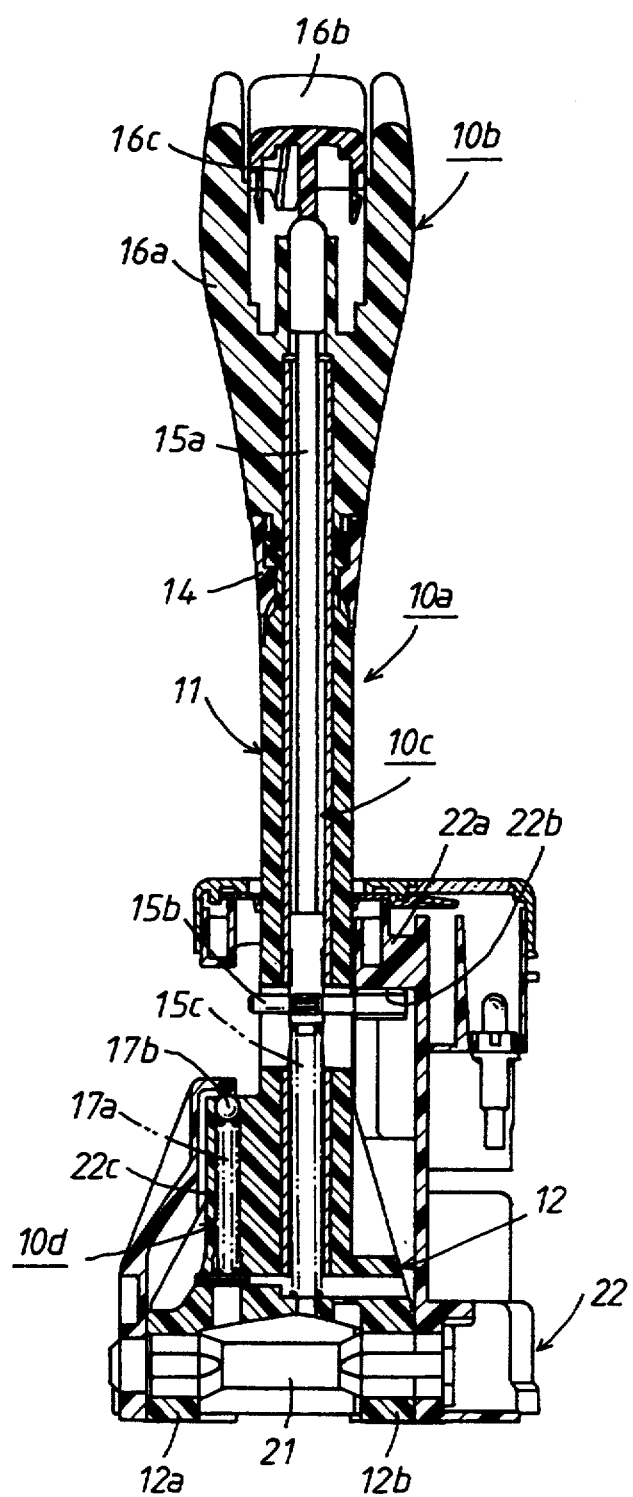
FIG. 2 is a vertical sectional view of the change-speed operation mechanism.

Referring now to the drawings, FIG. 1 illustrates a change-speed operation mechanism which is mounted on a support block 22 secured to a vehicle body structure (not shown) and operatively connected to an automatic transmission (not shown). As shown in FIGS. 1 and 2, the change-speed operation mechanism includes a shift lever 10a, an operation knob 10b, a first detent mechanism 10c and a second detent mechanism 10d. The shift lever 10a is composed of a tubular body portion 11 integrally formed at its lower end with a support portion 12 perpendicularly thereto and a connecting arm 13 extending forwardly from its lower end portion. The operation knob 10b is assembled with the upper end of tubular body portion 11 by means of a joint means 14. The first detent mechanism 10c is disposed within an axial bore of the tubular body portion 11, and the second detent mechanism 10d is assembled with the lower end of the tubular body portion 11 at one side thereof. As shown in FIG. 2, a lateral support shaft 21 is coupled within an axial bore of the support portion 12 and carried on mutually opposed upstanding portions of the support block 22 so that the shift lever 10a is arranged to be rotated forwardly or backwardly. In a condition where the shift lever 10a has been assembled with the support block 22 as described above, the connecting arm 13 of shift lever 10a is connected at its distal end to one end of an inner wire 23 of an operation cable as shown in FIG. 1, and the other end of inner wire 23 is connected to a shift arm (not shown) of the automatic transmission.

As clearly shown in FIG. 2, the first detent mechanism 10c includes an operation rod 15a, a lateral engagement pin 15b and a compression coil spring 15c. The operation rod 15a is slidably disposed within the axial bore of tubular body portion 11 of shift lever 10a. The engagement pin 15b is fixed to the lower end of operation rod 15a perpendicularly thereto and extends outwardly at its opposite ends through a pair of elongated holes formed in the peripheral wall of tubular body portion 11. The compression coil spring 15c is disposed within the axial bore of tubular body portion 11 to bias the operation rod 15a upwardly. In such an arrangement of the first detent mechanism 10c, the engagement pin 15b is loaded upward by the compression coil spring 15c and engaged at its right-hand end with one of plural recesses 22b formed on the right-hand upstanding portion 22a of support block 22 to restrict the forward or backward movement of the shift lever 10a.

As clearly shown in FIG. 1, the operation knob 10b has a grip portion 16a, an operation button 16b rotatably assembled within the grip portion 16a and exposed outwardly at its upper part and a torsion spring 16c assembled within the grip portion 16a. The operation button 16b is loaded upward by the load of torsion spring 16c and is maintained in resilient engagement with the upper end of operation rod 15a of the first detent mechanism 10c. When the operation button 16b is rotated downward against the load of torsion spring 16c, the operation rod 15a is moved downward by engagement with the operation button 16b to disengage the engagement pin 15b from the recess 22b of support block 22 thereby to permit forward or backward movement of the shift ever assembly. Thus, the shift lever assembly can be shifted to a desired change-speed position. When the operation button 16b is released from the effort applied thereto after adjustment of the shift lever assembly, the operation rod 15a is moved upward under the load of compression spring 15c so that the engagement pin 15b is resiliently engaged with a selected recess 22b of support block 22 to hold the shift lever assembly in an upstanding condition at the shifted position.

As clearly shown in FIG. 2, the second detent mechanism 10d includes a compression coil spring 17a disposed within an additional axial bore formed in the lower end of tubular body portion 11 and a detent ball 17b carried by the compression coil spring 17a. The detent ball 17b is maintained in engagement with one of plural recesses formed on the left-hand upstanding portion 22c of support block 22. In the second detent mechanism 10d, the detent ball 17b passes over the recess engaged therewith in forward or backward movement of the shift lever assembly and is successively engaged with other recesses of the left-hand upstanding portion 22c under the load of compression coil spring 17a. This is effective to apply an operational feel to the operator in shifting operation of the shift lever assembly and to retain the shift lever assembly in its shifted position.

As shown in FIGS. 3 to 6, the tubular body portion 11, support portion 12 and connecting arm 13 of the shift lever 10a are integrally made of synthetic resin. The tubular body portion 11 is composed of an outer tubular rod 11a of synthetic resin and a metallic inner pipe 11b. As clearly shown in FIGS. 4 and 5, the lower portion of outer tubular rod 11a is enlarged in width toward the support portion 12, and the metallic inner pipe 11b is united with the tubular rod 11a in a condition inserted therein. The inner pipe 11b contains the operation rod 15a of the first detent mechanism 10c inserted therein and is connected at its upper end with the grip portion 16a of operation knob 10b by means of the joint means 14. The support portion 12 integrally formed with the lower end of outer tubular rod 11a has a pair of axially spaced cylindrical bearing portions 12a and 12b for coupling with the support shaft 21.

Figure 3:
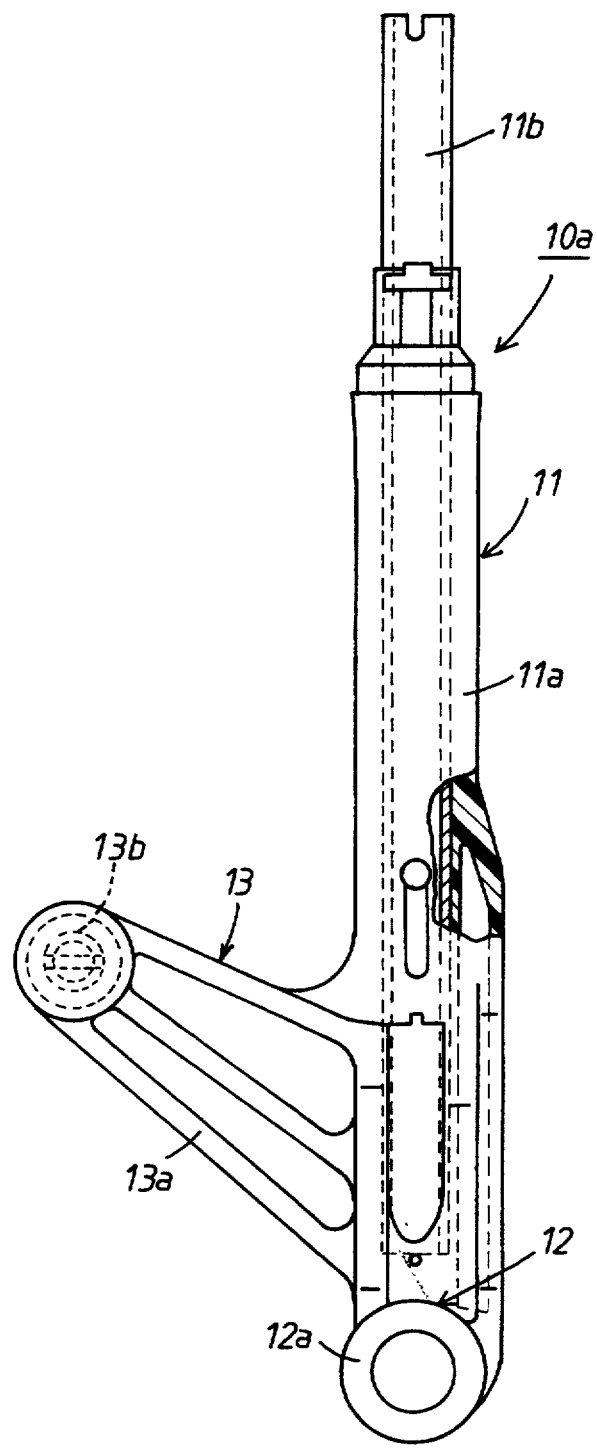
FIG. 3 is a partly broken side view of the shift lever assembly shown in FIGS. 1 and 2.
Figure 4:
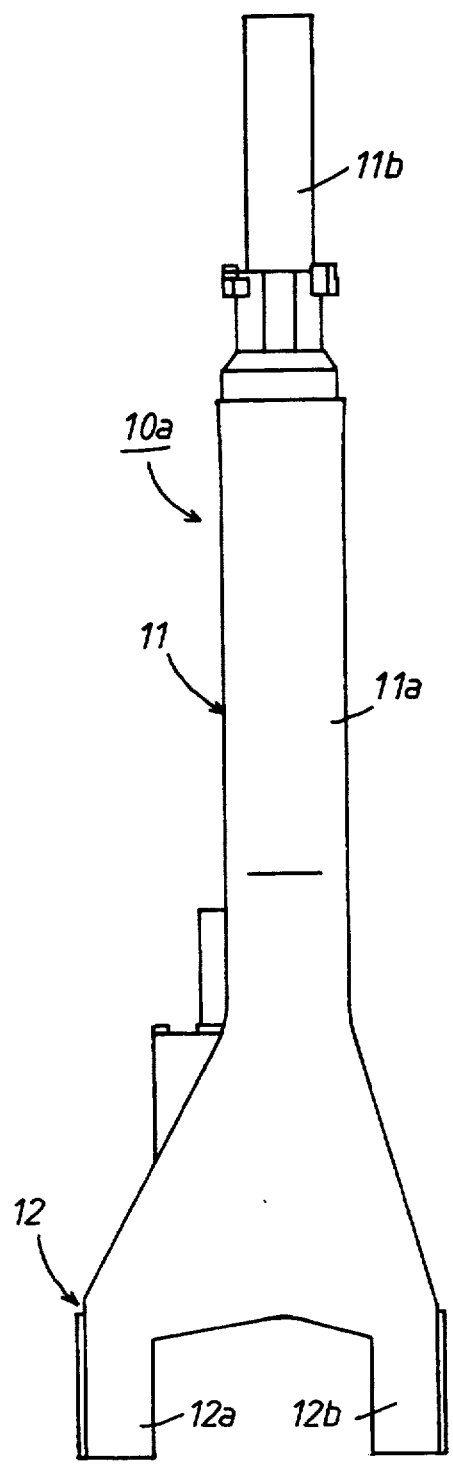
FIG. 4 is a rear view off the shift lever assembly.
Figure 6:
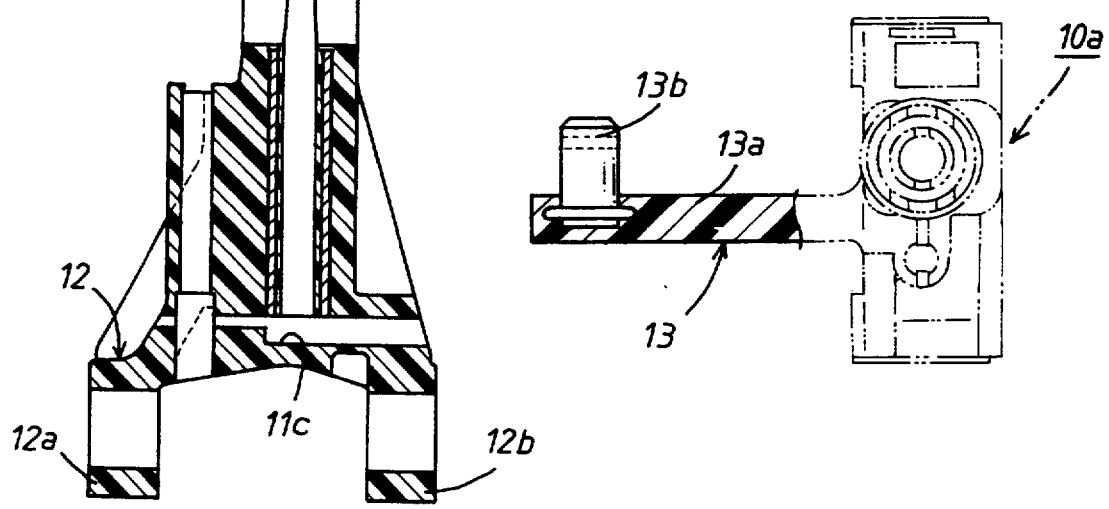
FIG. 6 is a partly sectional plan view of a connecting arm of the shift lever assembly shown in FIG. 3.

As shown in FIGS. 3 and 6, the connecting arm 13 has an arm portion 13a integrally formed with the lower end portion of tubular rod 11a and a metallic connecting pin 13b secured to the distal end of arm portion 13a perpendicularly thereto. The arm portion 13a is enlarged in width toward the lower end portion of tubular rod 11a from its distal end and reinforced by ribs formed thereon. During a manufacturing process of the shift lever 10a, the metallic inner pipe 11b and connecting pin 13b are positioned in place in a molding die of the shift lever 10a and integrally secured to the outer tubular rod 11a by synthetic resin applied to the molding die.

Since the outer tubular rod 11a, support portion 12 and connecting arm 13 are integrally made of synthetic resin, the weight of shift lever 10a can be noticeably reduced in comparison with the conventional metallic shift lever. Although the shift lever 10a is applied with a maximum load at its tubular body portion 11 and connecting arm 13 in shifting operation, it has a sufficient strength against the load acting thereon since the connecting arm 13 is composed of the arm portion 13a of synthetic resin reinforced in its configuration and the connecting pin 13b embedded in the distal end of arm portion 13a. The shift lever 10a is further characterized in that the tubular body portion 11 is widened at its lower end to restrain undesired lateral movement of the shift lever 10a and to enhance the support strength of shift lever 10a. Since the metallic inner pipe 11b and connecting pin 13b are embedded in the tubular body portion 11 and arm portion 13a during the molding process of the shift lever 10a, it is able to enhance the production efficiency and dimensional accuracy of the shift lever 10a.

Figure 5:
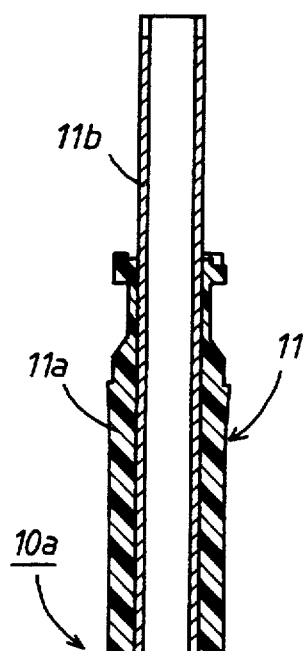
FIG. 5 is a vertical sectional view of the shift lever assembly.

In the shift lever 10a, it is to be noted that as shown in FIG. 5, the elongated holes of metallic inner pipe are covered with the synthetic resin of outer tubular rod 11a at their peripheries to eliminate rubbing noises caused by contact of the metallic engagement pin 15b with the metallic inner pipe 11b. The outer tubular rod 11a is formed at its bottom portion with a lateral cavity 11c which is formed by an insert die adapted to prevent entry of the synthetic resin into the inner pipe 11b during the molding process of the shift lever 10a. The bottom cavity 11c of tubular rod 11a is useful to receive the lower end of compression coil spring 15c of the first detent mechanism 10c.

In FIG. 7(a) there is illustrated a modification of the shift lever 10a designated by the reference numeral 10e, wherein the tubular body portion 11 is composed of an outer tubular rod 11d of synthetic resin and an inner metallic pipe 11e of rectangular cross-section embedded in the tubular rod 11d. The tubular rod 11d is formed at its central axis with an axial bore 11f and at one side thereof with an additional axial bore 11g. In this modification, the operation rod 15a of the first detent mechanism 10c is disposed within the axial bore 11f of tubular rod 11d, and a wire harness 18b of a switch 18a for automatic drive is inserted into the additional axial bore 11g of tubular rod 11d.

Figure 8:
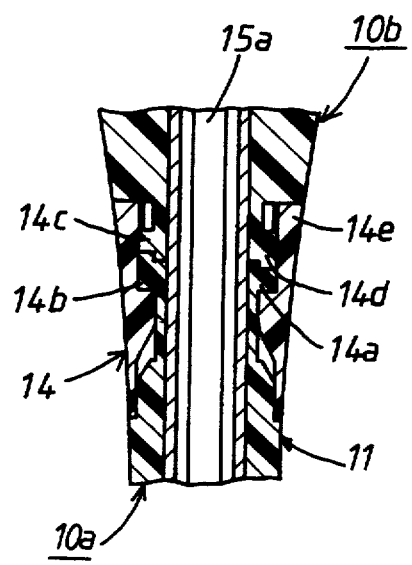
FIG. 8 is a partly enlarged sectional view of a joint portion of an operation knob and a tubular body portion of the shift lever assembly shown in FIG. 2.
Figure 9A:
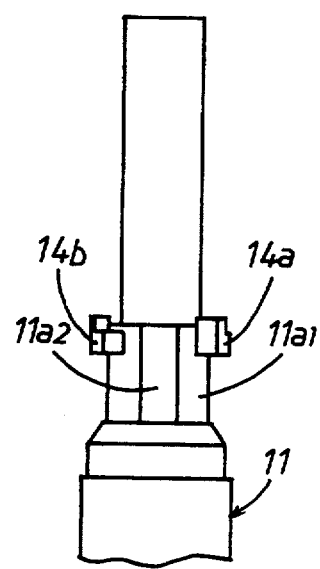
FIG. 9(a) is a partly enlarged rear view of an engagement portion of the tubular body portion shown in FIG. 8.
Figure 9B:
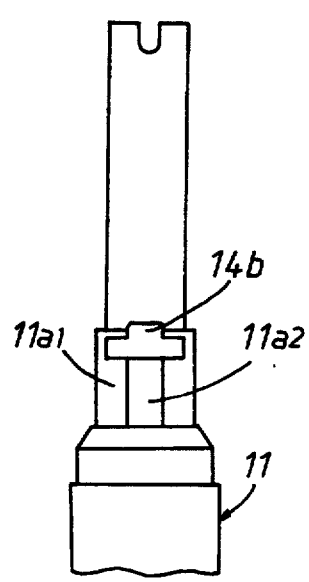
FIG. 9(b) is a partly enlarged side view of the engagement portion the tubular body portion shown in FIG. 8.
Figure 9C:
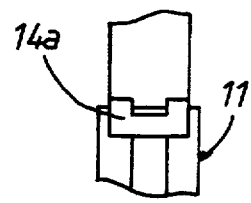
FIG. 9(c) is a partly enlarged opposite side view of the engagement portion of the tubular body portion shown in FIG. 8.
Figure 10A:
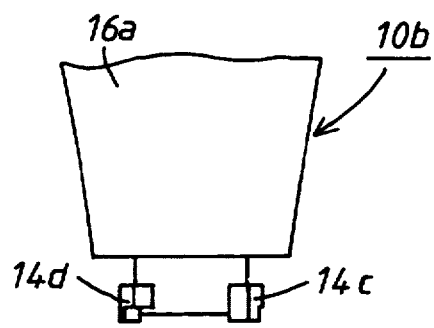
FIG. 10(a) is a partly enlarged front view of an engagement portion of the operation knob shown in FIG. 8.
Figure 10B:
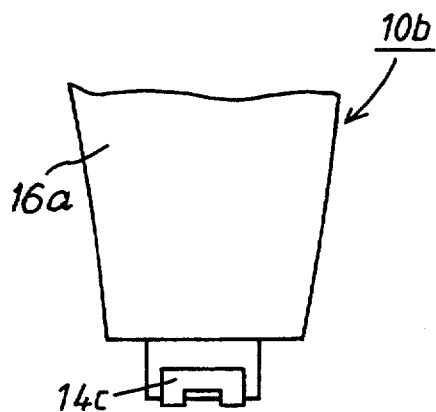
FIG. 10(b) is a partly enlarged side view of the engagement portion of the operation knob shown in FIG. 8.

Hereinafter, the construction of the joint means 14 will be described in detail. As shown FIG. 8, the joint means 14 is composed of a pair of diametrically opposed lugs 14a, 14b integrally formed on the upper end of tubular body portion 11 of the shift lever 10a, a pair of diametrically opposed lugs 14c, 14d integrally formed on the lower end of the grip portion 16a of operation knob 10b, and a cylindrical holder 14e coupled over the lugs 14a, 14b and 14c, 14d engaged to one another as described later. As shown in FIGS. 9(a)-9(c), the lugs 14a and 14b of tubular body portion 11 are radially outwardly protruded in a predetermined thickness. The lug 14a is formed with an upwardly recessed part, while the lug 14b is formed with an upwardly projected part. As shown in FIGS. 10(a) and 10(b), the lugs 14c and 14d of grip portion 16a are radially outwardly protruded in a predetermined thickness. The lug 14c is formed with a downwardly recessed part, while the lug 14d is formed with a downwardly projected part. In a condition where the grip portion 16a of operation knob 10b has been engaged at its lower end with the upper end of tubular body portion 11, the lugs 14c, 14d of grip portion 16a can be engaged with the lugs 14b, 14a of tubular body portion 11 to restrict relative rotation of the grip portion 16a and the tubular body portion 11.

Figure 11A:
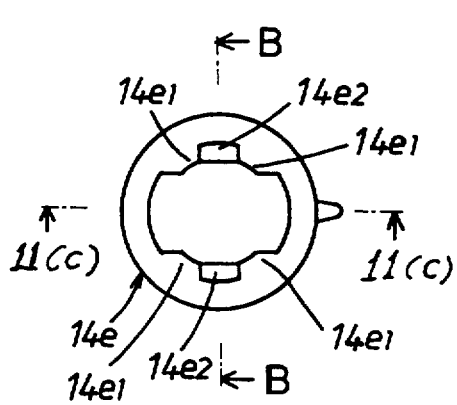
FIG. 11(a) is an enlarged plan view of a holder shown FIG. 8.
Figure 11B:
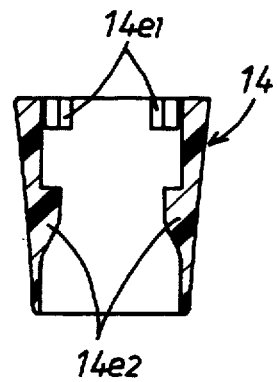
FIG. 11(b) is a vertical sectional view taken along line B—B in FIG. 11(a)
Figure 11C:
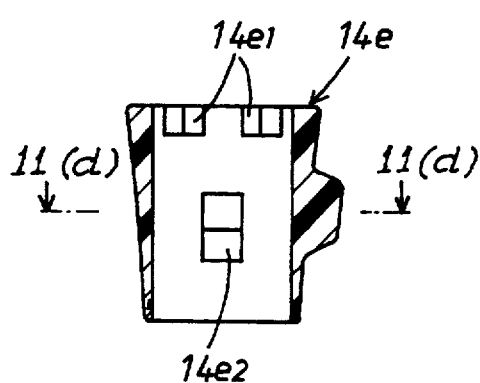
FIG. 11(c) is a vertical sectional view taken along line 11(c)—11(c) in FIG. 11(a)

As shown in FIGS. 11(a)-11(d), the cylindrical holder 14e is integrally formed at its inner periphery with vertically spaced lugs 14e1 and 14e2. The cylindrical holder 14e is made of synthetic resin and has a cavity formed between the upper and lower lugs 14e1 and 14e2 for containing therein the lugs 14c, 14d of grip portion 16a engaged with the lugs 14b, 14a of tubular body portion 11 as described above. The upper lugs 14e1 of holder 14e are formed as two pairs of diametrically opposed lugs as shown in FIG. 11(a), while the lower lugs 14e2 of holder 14e are formed as a pair of diametrically opposed lugs which are located respectively below a space formed between each pair of upper lugs 14e1. The distance between the upper and lower lugs 14e1 and 14e2 is determined to approximately correspond with the vertical thickness of the lugs 14c, 14d of grip portion 16a and the lugs 14b, 14a of tubular body portion 11 coupled with each other.

Figure 11D:
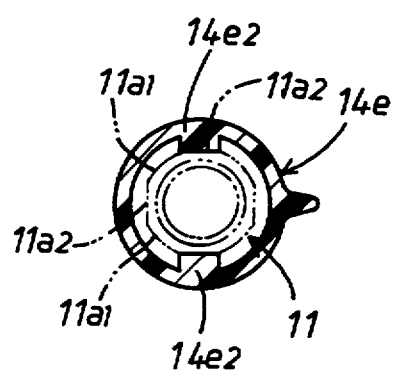
FIG. 11(d) is a cross-sectional view taken along line 11(d)—11(d)in FIG. 11(c)

For connecting the grip portion 16a of operation knob 10b to the upper end of tubular body portion 11, the holder 14e is coupled at its opposite ends with the upper end of tubular body portion 11 and the lower end of grip portion 16a, and the grip portion 16a of operation knob 10b is rotated relative to the tubular body portion 11 so that the lugs 14c, 14d of grip portion 16a are coupled with the lugs 14b, 14a of tubular body portion 11. Thereafter, the holder 14c is rotated relative to the tubular body portion 11 so that the coupled lugs 14c, 14d and 14b, 14a are retained by engagement with the upper and lower lugs 14e1 and 14e2 of holder 14c. When the lugs 14c, 14d of grip portion 16a have been coupled with the lugs 14b, 14a of tubular body portion 11 as described above, the grip portion 16a of operation knob 10b is fixed to the tubular body portion 11 of shift lever 10a in a circumferential direction. When the coupled lugs 14c, 14d and 14b, 14a have been retained by engagement with the upper and lower lugs 14e1, 14e2 of holder 14c, the grip portion 16a of operation knob 10b is firmly fixed to the tubular body portion 11 of shift lever 10a in an axial direction. When the holder 14e is rotated in the foregoing process, as shown in FIG. 11(d), the lower lugs 14c2 of holder 14e pass over cylindrical surfaces 11a1 of the tubular body portion 11 to be brought into engagement with chamfered flat surfaces 11a2 of the tubular body portion 11. In a condition where the lower lugs 14e2 of holder 14e have been fixed in position by engagement with the chamfered flat surfaces 11a2 of the tubular body portion 11, the holder 14e is retained in its fixed position unless it is forcibly rotated in a reverse direction. Thus, the grip portion 16a of operation knob 10b is fixedly connected to the upper end of tubular body portion 11 in a simple manner by coupling with the holder 14e at their lugs 14c, 14d and 14b, 14a and rotation of the holder 14e. In the Joint means 14, only the outer pheriphery of holder 14e is exposed without causing any defect in the appearance of the shift lever.

For disconnecting the grip portion 16a of operation knob 10b from the tubular body portion 11 of shift lever 10a, the holder 14e is forcibly rotated in the reverse direction so that the upper and lower lugs 14e1 and 14e2 of holder 14e are disengaged from the coupled lugs 14a, 14b, 14c, 14d of tubular body portion 11 and grip portion 16a. Thus, the lugs 14a, 14b of tubular body portion 15 can be disengaged from the lugs 14c, 14d of grip portion 16a to separate the grip portion 16a from the tubular body portion 11 for replacement with another operation knob.

Figure 12A:
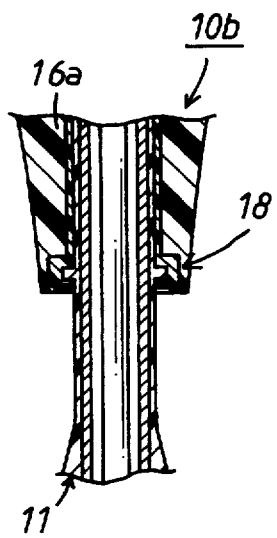
FIG. 12(a) is a sectional view of a modification of the joint portion of the operation knob and the tubular body portion of the shift lever assembly.
Figure 12B:
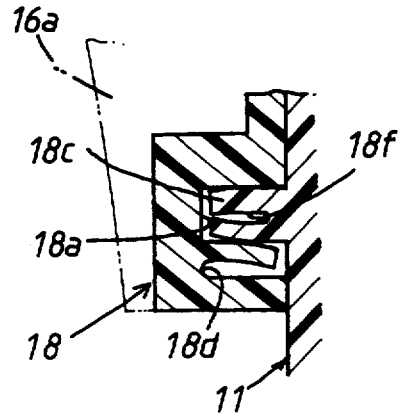
FIG. 12(b) is a partly enlarged sectional view of the modification shown in FIG. 12(a)
Figure 13A:
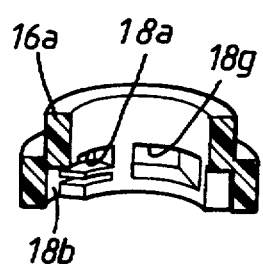
FIG. 13(a) is an enlarged sectional view of an engagement portion of the operation knob shown in FIG. 12(a)
Figure 13B:
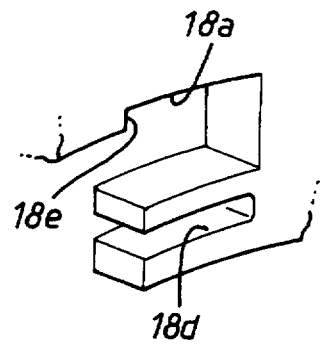
FIG. 13(b) is an enlarged perspective view of the engagement portion of the operation knob shown in FIG. 13(a)
Figure 14:
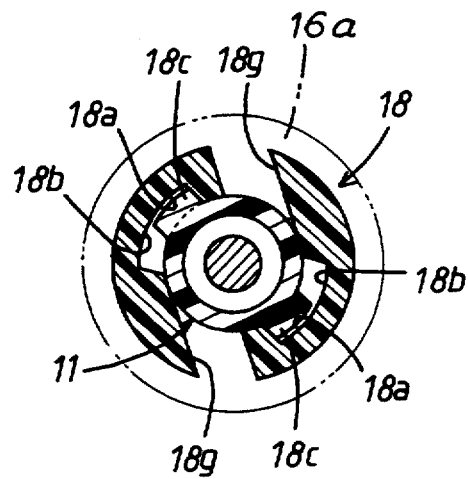
FIG. 14 is an enlarged cross-sectional view of the modification shown FIG. 12(a).

In FIGS. 12(a)-12(b), 13(a)-13(b) and 14, there is illustrated a modification of the joint means designated by the reference numeral 18. In this modification, the grip portion 16a of operation knob 10b is formed in its lower end with a pair of diametrically opposed semi-circular grooves 18a and a pair of diametrically opposed semi-circular grooves 18b, while the tubular body portion 11 of shift lever 10a is formed at its intermediate portion with a pair of diametrically opposed lugs 18c. As shown in FIGS. 13(a) and 13(b), each of the semi-circular grooves 18a opens into each of the semi-circular grooves 18b at one end thereof. Each lower side wall forming the respective semi-circular grooves 18a is formed with a circumferential slit 18d, and each upper side wall forming the respective semi-circular grooves 18a is stepped at its opening end 18e. As shown in FIG. 14, the lugs 18c of tubular body portion 11 each are formed to be coupled with each of the semi-circular grooves 18a. As shown in FIG. 12(b), the lugs 18c of tubular body portion 11 each are also formed with a circumferential slit 18f. In addition, a pair of diametrically opposed radial grooves 18g are formed to form the semi-circular grooves 18a in the inner periphery of the grip portion 16a.

For connecting the grip portion 16a of operation knob 10b to the upper end of tubular body portion 11, the grip portion 16a is coupled with the lugs 18c of tubular body portion 11 at its semi-circular grooves 18b and is rotated in a circumferential direction so that the lugs 18c of tubular body portion 11 are engaged with the semi-circular grooves 18a of grip portion 16a. During rotation of the grip portion 16a, as shown in FIG. 12(b), each lower portion of the lugs 18c is flexed upward by engagement with the lower side wall of grip portion 16a, while the lower side wall of grip portion 16a is flexed downward by engagement with the lugs 18c of tubular body portion 11. Thus, the grip portion 16a of operation knob 10b is retained by engagement with the lugs 18c of tubular body portion 11 at its stepped portions 18e to firmly connect the operation knob 10b to the tubular body portion 11 of shift lever 10a.

For disconnecting the operation knob 10b from the shift lever 10a, the grip portion 16a of operation knob 10b is forcibly pulled up to flex each upper portion of the lugs 18c downward and is rotated in a reverse direction so that the lugs 18c are coupled with the semi-circular grooves 18b of grip portion 16a. Thus, the grip portion 16a of operation knob 10b can be removed from the tubular body portion 11 of shift lever 10a when it is pulled up.

What is claimed is:

1. A shift lever assembly adapted for use in a power transmission of an automotive vehicle, comprising a shift lever having a tubular body portion formed therein with an axial bore and provided at a lower end thereof with a support portion to be mounted on a vehicle body structure and arranged perpendicularly to said tubular body portion and a connecting arm extending from said lower end of said tubular body portion perpendicularly to said support portion, an operation rod slidably disposed within said axial bore of said tubular body portion and provided at said lower end with a detente mechanism for retaining said shift lever in a shifted position, and an operation knob having a grip portion connected to an upper end of said tubular body portion and an operation button assembled with the grip portion and maintained in engagement with an upper end of said operation rod, wherein said tubular body portion, support portion and connecting arm of said shift lever are integrally made of synthetic resin, and wherein said tubular body portion of said shift lever is enlarged at lower end toward said support portion.

2. The shift lever assembly, as claimed in claim 1, wherein said connecting arm of said shift lever is enlarged in width toward said lower end of said tubular body portion and reinforced by a plurality of ribs formed thereon.

3. The shift lever assembly, as claimed in claim 1, wherein said tubular body portion of said shift lever is composed of an outer tubular rod made of synthetic resin and a metallic inner pipe united with said tubular rod inserted therein.

4. The shift lever assembly, as claimed in claim 1, wherein said connecting arm of said tubular body portion has a connecting arm portion made of synthetic resin and a metallic connecting pin embedded in a distal end of said connecting arm portion for operative connection to said power transmission.

5. The shift lever assembly, as claimed in claim 1, wherein a joint means for connecting said grip portion of said operation knob to said upper end of said tubular body portion of said shift lever comprises a pair of diametrically opposed lugs integrally formed on said upper end of said tubular body portion, a pair of diametrically opposed lugs integrally formed on a lower end of said grip portion to be engaged with said lugs of said tubular body portion for restricting relative rotation of said tubular body portion and said grip portion, and a cylindrical holder rotatably coupled over said lugs of said tubular body portion and said grip portion engaged to each other, said holder having vertically spaced lugs formed therein to retain said engaged lugs of said tubular body portion and said grip portion by engagement therewith when said holder is rotated in a circumferential direction.

6. The shift lever assembly, as claimed in claim 1, wherein a joint means for connecting said grip portion of said operation knob to said upper end of said tubular body portion of said shift lever comprises a pair of diametrically opposed lugs integrally formed with said upper end portion of said tubular body portion and a pair of diametrically opposed semi-circular grooves formed within a lower end portion of said grip portion, said semi-circular grooves each being formed with a stepped portion to be retained by engagement with each of said opposed lug.

* * * * *